US005121042A

United States Patent [19]

Ako

[11] Patent Number: 5,121,042

[45] Date of Patent: Jun. 9, 1992

[54] ELECTRO-HYDRAULIC SERVO MECHANISM

[75] Inventor: Hidenobu Ako, Redmond, Wash.

[73] Assignee: Tenin Seiko Co., Ltd., Osaka, Japan

[21] Appl. No.: 623,179

[22] Filed: Dec. 6, 1990

[30] Foreign Application Priority Data

Dec. 14, 1989 [JP] Japan ................................ 1-324216

[51] Int. Cl.[5] ................................................ G05B 9/03

[52] U.S. Cl. .................................... 318/657; 318/135; 318/563; 318/564; 318/632; 91/361; 91/363 R

[58] Field of Search ................................ 318/430–490, 318/560–680; 91/361, 363 A, 363 R, 364, 366, 367; 336/130, 135

[56] References Cited

U.S. PATENT DOCUMENTS

| | | | |
|---|---|---|---|
| 3,752,420 | 8/1973 | Osder | 318/584 X |
| 4,089,494 | 5/1978 | Anderson et al. | 91/363 R X |
| 4,251,762 | 2/1981 | Williams | 318/653 |
| 4,323,884 | 4/1982 | Durandeau et al. | 318/657 X |
| 4,587,883 | 5/1986 | Ehrentraut et al. | 91/363 R |
| 4,594,537 | 6/1986 | Ariffan et al. | 318/564 |
| 4,628,499 | 12/1986 | Hammett | 91/361 X |
| 4,658,908 | 4/1987 | Hannukainen | 318/636 X |
| 4,667,158 | 5/1987 | Redlich | 336/130 X |
| 4,712,470 | 12/1987 | Schmitz | 91/361 X |
| 4,807,516 | 2/1989 | Takats | 91/363 A |
| 4,817,498 | 4/1989 | Takagi | 91/361 |
| 4,860,634 | 8/1989 | Hein | 91/363 R |
| 4,881,414 | 11/1989 | Setaka et al. | 336/135 X |
| 4,902,947 | 2/1990 | Ako | 318/563 |
| 4,920,305 | 4/1990 | Benson et al. | 318/657 |
| 4,947,732 | 8/1990 | Hidenobu | 91/363 R X |
| 4,983,893 | 1/1991 | Miyashita et al. | 318/135 X |

*Primary Examiner*—Paul Ip
*Attorney, Agent, or Firm*—Lane, Aitken & McCann

[57] ABSTRACT

An electro-hydraulic servo mechanism comprising: a hydraulic actuator formed with a pair of hydraulic chambers and having an output member which is displaced by a differential pressure between the hydraulic chambers, the output member being connected with an object to be controlled; an electro-hydraulic converter for varying the differential pressure between the hydraulic chambers in response to an electric signal; a first differential transformer for outputting a first induced electromotive force proportional to the displacement of the output member; a control circuit for generating the electric signal in response to the output of the first differential transformer and to an external command signal and for outputting the electric signal to the electro-hydraulic converter; a pressure receiving member that is displaced in response to the differential pressure between the hydraulic chambers; and a second differential transformer for outputting a second induced electromotive force proportional to the displacement of the pressure receiving member and for biassing the output of the second differential transformer to the output of the first differential transformer.

6 Claims, 3 Drawing Sheets

ELECTRO-HYDRAULIC SERVO MECHANISM

FIELD OF THE INVENTION

The present invention relates generally to an electro-hydraulic servo mechanism, and more particularly to such a mechanism which is effective when a single object is controlled by a plurality of hydraulic actuators connected in parallel.

DESCRIPTION OF THE PRIOR ART

In a conventional electro-hydraulic servo mechanism, such as an electro-hydraulic servo mechanism for controlling a control surface such as the flaps, rudder and the like of an aircraft, a plurality of hydraulic actuators are provided in parallel with respect to the same object to be controlled, and operated parallel at the same time in response to a servo command signal. An electro-hydraulic servo mechanism such as this is designed so that the control surface can be controlled even when any of the hydraulic actuators broke down. In the electro-hydraulic servo mechanism of the above kind, for example, the control as shown in FIG. 5 is performed. FIG. 5 illustrates the relationship between the servo error in the actuator which is at a standstill (steady state) and the actuator output.

If in FIG. 5 the difference (deviation) between a required position value and actual position of a hydraulic actuator 1 e.g., hydraulic cylinder) is δx, the amplification gain of an amplifier 2 is $K_1$, the conversion gain of a position detector 3 is $K_2$, and the piston pressure-receiving area of the hydraulic actuator 1 is A, then the servo error e becomes $K_2\,\delta x$.

Since, in a range in which the valve pressure gain $K_3$ of an agnetic servo valve 4 is not saturated, the reaction force F of the hydraulic actuator 1 and an external force $\overline{F}$ are balanced, the following equation (1) is obtained:

$$\begin{aligned} F &= \overline{F} \\ &= e \cdot K_1 \cdot K_3 \cdot A \end{aligned} \tag{1}$$

Therefore, if it is assumed that in the balanced state the rigidity of the hydraulic actuator 1 with respect to the external force F is $K_A$, then the rigidity $K_A$ can be expressed by the following equation (2):

$$\begin{aligned} K_A &= \overline{F}/\delta x \\ &= (e \cdot K_1 \cdot K_3 \cdot A)/(e/K_2) \\ &= K_1 \cdot K_2 \cdot K_3 \cdot A \end{aligned} \tag{2}$$

That is to say, the rigidity of the hydraulic actuator 1 with respect to the external force is constant.

However, in the electro-hydraulic servo mechanism described above, there is the problem that an excess stress occurs when an object to be controlled is held by the hydraulic actuator 1. In the control of the control surface of an aircraft, the same control surface is controlled by a plurality of the hydraulic actuators 1 each having a fixed rigidity and connected in parallel with one another. For this reason, there is the problem that the conflict of forces fight force) arises between a plurality of the hydraulic actuators having the same rigidities due to the position accuracy errors of the hydraulic actuators 1 and the fluctuations in the manipulation force occur. This exerts undesirable stresses on an object to be controlled.

Accordingly, it is an object of the present invention to provide an improved electro-hydraulic servo mechanism wherein the above described fight force and the fluctuations in the manipulation force are alleviated by suitably adjusting the rigidity of the actuator in the servo mechanism.

It is another object of the present invention to provide an improved electro-hydraulic servo mechanism wherein unnecessary forces are prevented from occurring in an object to be controlled by suitably adjusting the rigidity of the actuator in the servo mechanism.

It is still another object of the present invention to provide an improved electro-hydraulic servo mechanism which is capable of exerting a large force on an object to be controlled.

SUMMARY OF THE INVENTION

In accordance with an important aspect of the present invention, there is provided an electro-hydraulic servo mechanism comprising:

a hydraulic actuator formed with a pair of hydraulic chambers and having an output member which is displaced by a differential pressure between the hydraulic chambers, the output member being connected with an object to be controlled;

an electro-hydraulic conversion means for varying the differential pressure between the hydraulic chambers in response to an electric signal;

a first differential transformer for outputting a first induced electromotive force proportional to the displacement of the output member;

a control circuit for generating the electric signal in response to the output of the first differential transformer and to an external command signal and for outputting the electric signal to the electro-hydraulic conversion means;

a pressure receiving member that is displaced in response to the differential pressure between the hydraulic chambers; and a second differential transformer for outputting a second induced electromotive force proportional to the displacement of the pressure receiving member and for biassing the output of the second differential transformer to the output of the first differential transformer.

In the present, the pressure receiving member is displaced in response to the differential pressure between the hydraulic chambers of the actuator for displacing the output member, and the output of second differential transformer corresponding to the displacement of the pressure receiving member is biased to the output of the first differential transformer corresponding to the displacement of the output member.

Therefore, if forces are exerted on the output member by the conflict of forces (fight force) in the hydraulic actuators that are at a standstill and if a difference pressure occurs between the hydraulic chambers, then the pressure receiving member is displaced by the difference pressure and the output of second differential transformer is biased to the output of the first differential transformer. The steady-state deviation of the servo loop is then increased so that the conflict of forces between the hydraulic actuators is reduced, and the rigidity of the actuator is adjusted to alleviate the conflict of forces between the hydraulic actuators. In addition, instead of alleviating the fight force (conflict of forces), the output of second differential transformer can also be biased to the output of the first differential transformer so that a position control reducing a steady-state deviation caused by an external force is performed.

The above described electro-hydraulic conversion means may comprise an electromagnetic servo valve of the proportional control type.

The above described first differential transformer may comprise a core member connected to the output member, a primary coil, and a secondary coil consisting of a pair of first and second coils for generating the first induced electromotive force, the first and second coils being connected so that they are reversed polarities. The above described second differential transformer may comprise a core member coupled to the pressure receiving member, a primary coil connected in series with the primary coil of the first differential transformer, and a secondary coil consisting of a pair of first and second coils for generating the second induced electromotive force, the first coil of the secondary coil of the second differential transformer being connected in series with the first coil of the secondary coil of the first differential transformer, and the second coil of the secondary coil of the second differential transformer being connected in series with the second coil of the secondary coil of the first differential transformer.

The above described control circuit may comprise a rectification circuit connected to the second differential transformer, an operational amplifier connected to the rectification circuit, a smoothing filter connected to the operational amplifier, a summing amplifier to which the output of the operational amplifier and the external command signal are inputted, and a current amplifier.

The above described object to be controlled may be a control surface such as the rudder, elevator, ailerons, flaps of an aircraft.

BRIEF DESCRIPTION OF THE DRAWINGS

The drawbacks of a conventional electro-hydraulic servo mechanism and the features and advantages of an electro-hydraulic servo mechanism according to the present invention will be more clearly understood from the following detailed description when read in conjunction with the accompanying drawings wherein.

DESCRIPTION OF THE PREFERRED EMBODIMENTS

Figure 1:
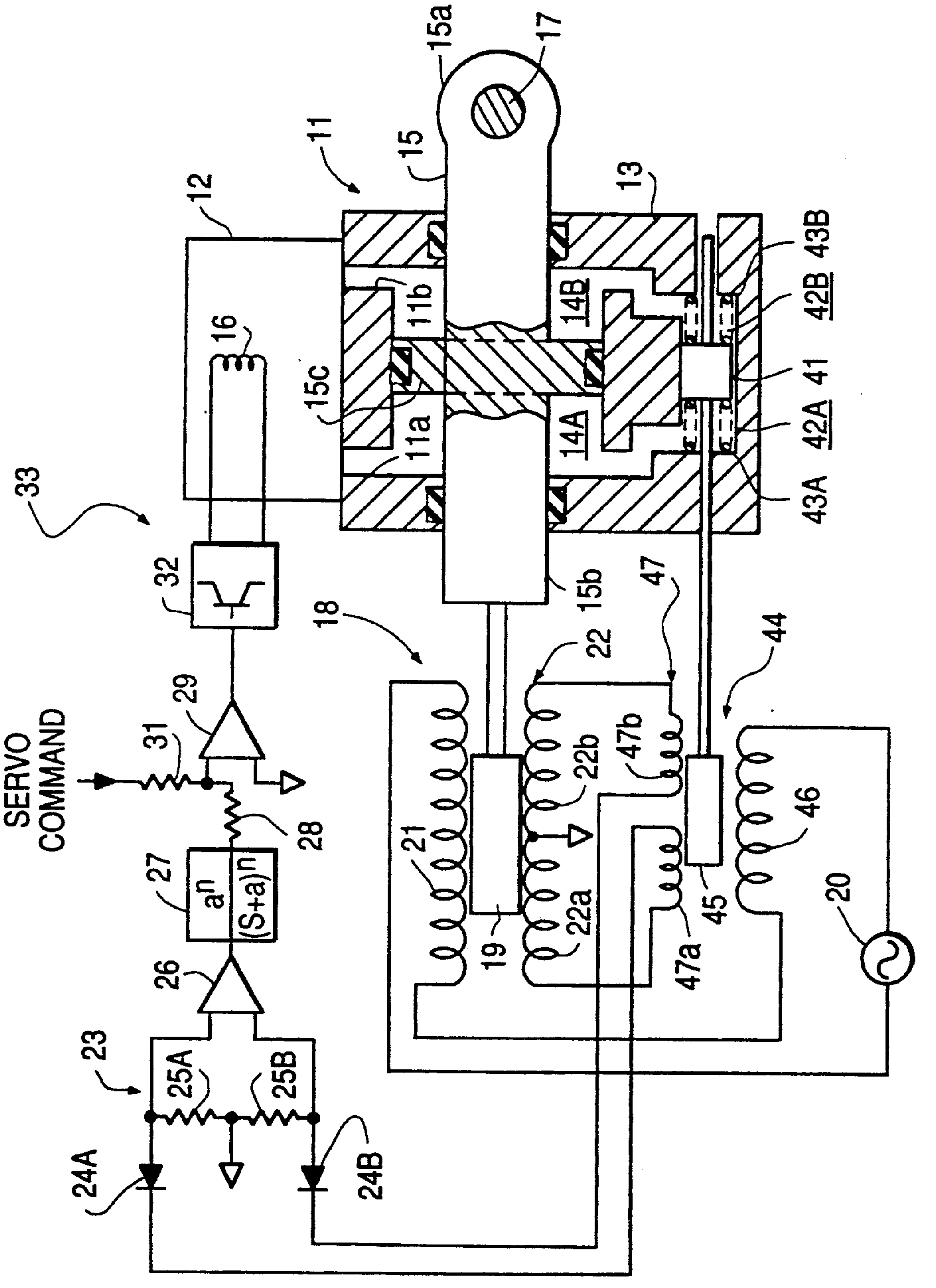
FIG. 1 is a schematic view, partly in section, showing one embodiment of an electro-hydraulic servo mechanism according to the present invention.

Referring to FIG. 1, there is shown a preferred embodiment of an electro-hydraulic servo mechanism in accordance with the present invention.

In the figure, reference numeral 11 is a direct operated hydraulic actuator and 12 an electro-hydraulic conversion means (for example, electromagnetic servo valve of the proportional control type). The direct operated hydraulic actuator 11 comprises a cylinder 13 formed at its upper portion with ports 11*a* and 11*b*, and a main piston 15 (output member) with a pressure receiving radial portion 15*c* which is freely slidably on the cylinder 13 and which defines first and second hydraulic chambers 14A and 14B. The first hydraulic chamber 14A is held in fluid communication with the port 11*a* of the electromagnetic servo valve 12, while the second hydraulic chamber 14B is held in fluid communication with the port 11*b* of the electromagnetic servo valve 12. The electromagnetic servo valve 12 has a pressure port (not shown) connected to an external hydraulic pump and a drain port (not shown) connected to an external oil tank. The electromagnetic servo valve 12 drives an internal spool (not shown) by a solenoid including an electromagnetic coil 16 in response to an electric signal input which will hereinafter be described, and can change the differential pressure between the hydraulic chambers 14A and 14B by connecting the pressure port (not shown) of the electromagnetic servo valve 12 with one port 11*a* or 11*b* of the cylinder 13 and connecting the drain port (not shown) of the valve 12 with the other part 11*b* or 11*a*. The hydraulic actuator 11 displaces the main piston 15 axially of the main piston 15 by the differential pressure between the hydraulic chambers 14A and 14B caused by the operation of the electromagnetic servo valve 12, and controls a control surface (not shown), such as the rudder, elevator, ailerons, flaps of an aircraft, through a connection member 17 coupled to the forward end portion 15*a* of the main piston 15. The position (displacement) of the main piston 15 is detected at its rearward end portion 15*b* by a first differential transformer 18.

The first differential transformer 18 comprises a core member 19 connected to the rearward end portion 15*b* of the main piston 15 for moving together with the main piston 15, a primary coil 21 that is excited with a fixed frequency and fixed voltage from an AC power 20, and a secondary coil 22 consisting of a pair of coils 22*a* and 22*b* for generating an induced electromotive force proportional to the position of the core member 19. The coils 22*a* and 22*b* of the secondary coil 22 are connected with reversed polarities so that the output voltages in the coils 22 are zero when the core member 19 is held in a reference position (the position shown in FIG. 1). The differential voltage between the coils 22*a* and 22*b* is outputted to the rectification circuit 23. The rectification circuit 23 comprises a diode 24A and a resistor 25A corresponding to the coil 22*a* of the secondary coil 22, and a diode 24B and a resistor 25B corresponding to the coil 22*b* of the secondary coil 22. The output of the secondary coil 22 is rectified by the rectification circuit 23 and inputted to the amplifier 26 as a voltage between the input terminals of the operational amplifier 26. The operational amplifier 26 is connected through a smoothing filter 27 and through a resistor 28 to one input terminal of a summing amplifier 29. The current from the operational amplifier 26 and an external servo command, which is inputted through a resistor 31, are supplied to the summing amplifier 29. The output current of the summing amplifier 29 is inputted to and amplified by a current amplifier 32 comprising a transistor, etc. The amplified current by the amplifier 32 is inputted to the electromagnetic coil 16 of the electromagnetic servo valve 12. That is, the rectification circuit 23, the operational amplifier 26, the smoothing filter 27, the resisters 28, 31, the summing amplifier 29, and the current amplifier 32 as a whole constitute a control circuit 33 which generates an electric signal, which is an input signal to the electromagnetic coil 16, in response to the output of the first differential transformer 18 and to the external servo command, and which outputs the generated electric signal to the electromagnetic servo valve 12.

A modulating piston (pressure receiving member) is freely slidably housed in the lower portion of the cylinder 13 in parallel relationship to the main piston 15. The modulating main piston 15 defines a pressure receiving chamber 42A communicating with the first hydraulic chamber 14A and a pressure receiving chamber 42B communicating with the hydraulic chamber 14B. Springs 43A and 43B are provided within the pressure receiving chambers 42A and 42B so that the modulating piston 41 can be held in a position wherein the reaction forces of the springs 43A and 43B are balanced. If a differential pressure occurs between the hydraulic chambers 14A and 14B, the modulating piston 41 is subjected to the differential pressure between the pressure receiving chambers 42A and 42B which is the difference pressure between the hydraulic chambers 14A and 14B, and is displaced. The displacement of the modulating piston 41 is detected by a second differential transformer 44. The second differential transformer 44 comprises a core member 45 coupled to the modulating piston 41 for moving together with the piston 41, a primary coil 46 that is excited with a fixed frequency and a fixed voltage by the AC power 20 and connected in series with the primary coil 21 of the first differential transformer 18, and a secondary coil 47 consisting of a pair of coils 47_a_ and 47_b_ for generating an induced electromotive force proportional to the position of the core member 45. The secondary coil 47 of the second differential transformer 44 is interposed between the rectification circuit 23 and the secondary coil 22 of the first differential transformer 18. The coil 47_a_ of the secondary coil 47 of the second differential transformer 44 is connected in series with the coil 22_a_ of the secondary coil 22 of the first differential transformer 18, and likewise, the coil 47_b_ is connected in series with the coil 22_b_. The output (induced electromotive force) of the secondary coil 47 corresponding to the displacement of the core member 45 is added as a bias to the output of the first differential transformer 18.

Figure 2:
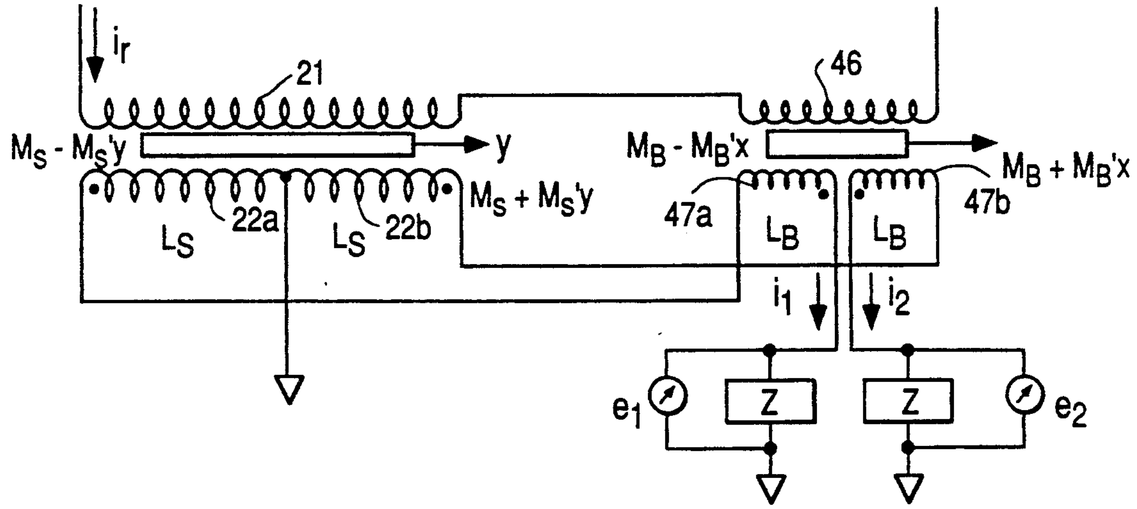
FIG. 2 illustrates an electric bias caused by the second differential transformer of FIG. 1.

The electrical bias can be expressed with the use of a simple diagram and a state equation, as shown in FIG. 2. In the figure, $i_P$ is a primary side current that flows through the primary coils 21 and 46, y a displacement of the main piston 15, x a displacement of the modulating piston 41, $M_S$ a mutual inductance of the first differential transformer 18 when y=0, $M_B$ a mutual inductance of the second differential transformer 44 when x=0, $M_S'y$ an amount of change of the mutual inductance $M_S$ corresponding to the displacement y of the main piston 15, $M_B'x$ an amount of change of the mutual inductance $M_B$ corresponding to the displacement x of the modulating piston 41, $L_S$ and $L_S$ self-inductances of the coils 22_a_ and 22_b_ of the first differential transformer 18, $L_B$ and $L_B$ self-inductances of the coils 47_a_ and 47_b_ of the second differential transformer 47, $i_1$ a current that flows through a secondary side loop A including the diode 24A and resistor 25A, $i_2$ a current that flows through a secondary side loob B including the diode 24B and resistor 25B, Z and Z impedances of the loops A and B of the rectification circuit 23, $e_1$ an output voltage of the secondary loop A, and $e_2$ an output voltage of the secondary loop B.

If it is assumed that the primary side current $i_P$ is controlled without undergoing the influence of the current changes of the secondary side currents $i_1$ and $i_2$, the relationship between the outputs of the first and second differential transformers 18, 44 and the displacements x, y can be expressed by the following equation (3):

$$(M_S + M_S'y)\frac{di_P}{dt} + (M_B + M_B'x)\frac{di_P}{dt} + (L_S + L_B)\frac{di_2}{dt} + Zi_2 = 0 \quad (3)$$

By Laplace-transforming the equation (1), the following equation (4) is obtained:

$$I_2 = (M_S + M_S'y + M_B + M_B'x)SI_P / \{(L_S + L_B)S + Z\} \quad (4)$$

Since $e_2 = Zi_2$, $S = j\omega$, and $(L_S + L_B)j\omega << Z$, the following equation (5) is obtained:

$$E_2 = (M_S + M_S'y + M_B + M_B + M_B'x)SI_P \quad (5)$$

In the above equations (4) and (5), the capital letters of the variables such as $I_2$ and $E_2$ are intended to mean Laplace transform, S a Laplace operator, j an imaginary unit, and 107 a primary side current frequency.

Since the coils 22_a_ and 22_b_ of the secondary coil 22 are connected so that they become reversed polarities, the following equation (6) likewise obtained:

$$E_1 = (M_S - M_S'y + M_B - M_B'x)SI_P \quad (6)$$

If it is assumed that the output of the rectification circuit 23 is $E_2 - E_1$, the following equation (7) is obtained:

$$|(E_2 - E_1)/I_P| = (2M_S'y + 2M_B'x)\omega \quad (7)$$

Thus, it will be understood that the output of the second differential transformer 44 proportional to the displacement of the modulating piston 41 is biased to the output of the first differential transformer 18 proportional to the displacement of the main piston 15.

The operation of the electro-hydraulic servo mechanism described above will hereinafter be described.

Figure 3:
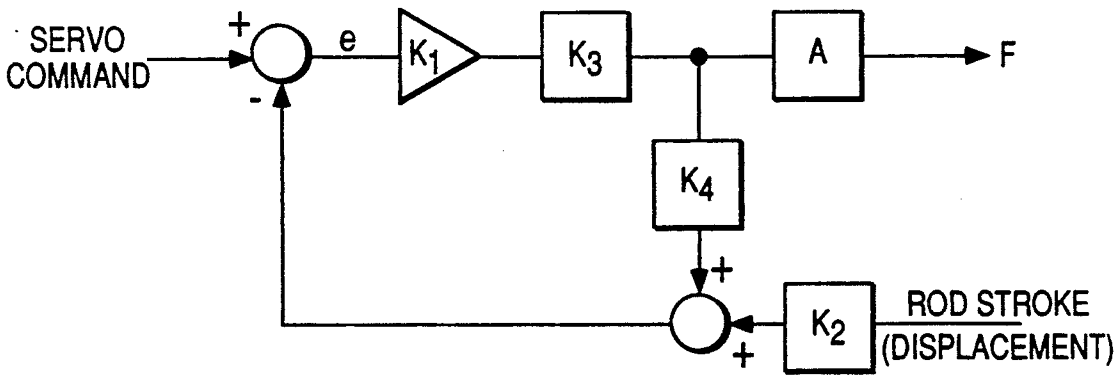
FIG. 3 is a block diagram representing the state that the main piston of the hydraulic actuator of FIG. 1 is at a standstill and that an external force and the reaction force the hydraulic actuator are balanced.
Figure 4:
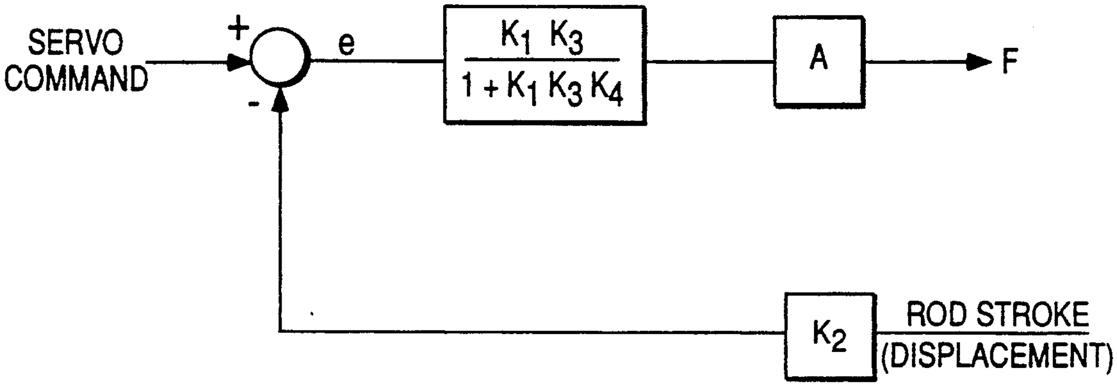
FIG. 4 is a block diagram representing a modification of FIG. 3.

Assume now that the main piston 15 of the hydraulic actuator 11 is at a standstill and that an external force $\bar{F}$ and the reaction force F of the hydraulic actuator 11 are balanced. This state is shown in FIG. 3 and can be modified as shown in FIG. 4. In FIGS. 3 and 4, e is a servo error, $K_1$ an amplification gain of the operational amplifier 26, $K_2$ a conversion gain (corresponding to $2M_S'$) for converting the displacement y of the main piston 15 to the output of the first differential transformer 18, $K_3$ a valve pressure gain of the electromagnetic servo valve 12, $K_4$ a conversion gain for converting the differential pressure between the hydraulic pressures 14A and 14B to the output of the second differential transformer 44 (the bias output of the first differential transformer 18), and A a pressure receiving area of the main piston 15.

If it is assumed that the difference (steady-state deviation) between a required position value and an actual position of the main piston 15 is $\delta x$, the servo error e becomes $K_2 \cdot \delta x$. The reaction force F of the hydraulic actuator 11 with respect to the external force $\bar{F}$ can be expressed by the following equation (8):

$$F = e \cdot (K_1K_3)/(1 + K_1K_3K_4) \cdot A \quad (8)$$

The rigidity $K_A$ of the hydraulic actuator 11 with respect to the external force $\overline{F}$ will become:

$$K_A = F/\delta x \quad (9)$$
$$= \{e \cdot (K_1K_3)/(1 + K_1K_3K_4) \cdot A\}/(e/K_2)$$
$$= \{1/(1 + K_1K_3K_4)\}(K_1K_2K_3 \cdot A)$$

Figure 5:
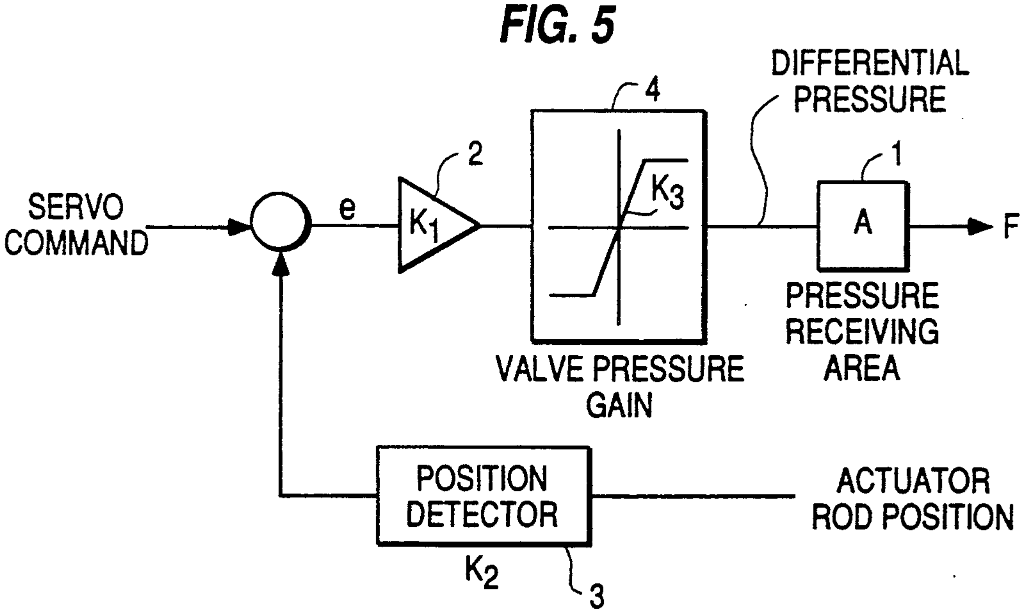
FIG. 5 is a schematic view showing a conventional electro-hydraulic servo mechanism.

Therefore, if the coil directions of the first and second differential transformers 18 and 44 and the oil sageways to the modulating piston 41 are set so that all of $K_1$, $K_2$, $K_3$, and $K_4$ become plus, the rigidity $K_A$ of the hydraulic actuator 11 is reduced to $1/(1+K_1K_3K_4)$, as compared with the conventional actuator rigidity that has been explained in FIG. 5 and with the equation (2).

Thus, in the embodiment described above, the voltage generated by the second differential transformer 44 is biased to the output voltage of the first differential transformer 18, so that the rigidity $K_A$ of the hydraulic actuator 11 with respect to the external force $\overline{F}$ is adjusted. Therefore, in a case where the control surface, such as the rudder, elevator, ailerons, flaps of an aircraft, is controlled by a plurality of actuators 11 coupled to the connection member 17, the fight force between the actuators caused by position accuracy errors between control loops can be alleviated and unnecessary stresses prevented from occurring in the control surfaces, the hydraulic actuators and the individual portions of the connection members 17 to which the actuators are coupled. In addition, if the coil direction of the second differential transformer 44 is changed so the $K_4$ in the equation (9) becomes minus, the steady-state deviation by an external force can be reduced in the position control by the hydraulic actuator 11. For example, the steady-state deviation by an external force can be alleviated, when the pressure gain of the electromagnetic servo valve in a servo loop is extremely small and therefore the steady-state deviation by an external force becomes a serious problem.

In the present, the pressure receiving member is displaced in response to the differential pressure between the hydraulic chambers of the actuator for displacing the output member, and the output of second differential transformer corresponding to the displacement of the pressure receiving member is biased to the output of the first differential transformer corresponding to the displacement of the output member.

Therefore, if forces are exerted on the output member by the conflict of forces (fight force) in the hydraulic actuators that are at a standstill and if a difference pressure occurs between the hydraulic chambers, then the pressure receiving member is displaced by the difference pressure and the output of second differential transformer is biased to the output of the first differential transformer. The steady-state deviation of the servo loop is then increased so that the conflict of forces between the hydraulic actuators is reduced, and the rigidity of the actuator is adjusted to alleviate the conflict of forces between the hydraulic actuators. In addition, instead of alleviating the fight force (conflict of forces), the output of second differential transformer can also be biased to the output of the first differential transformer so that a position control reducing a steady-state deviation caused by an external force is performed.

While the electro-hydraulic servo mechanism according to the present invention has been described with relation to the control of the control surfaces of an aircraft, it is noted that it is also applicable to various controls which require a large steady-state deviation of servo mechanism. For example, in a case where parts and soft bodies are gripped by a robot using a plurality of actuators, an excess load caused by fluctuations in the control of the individual gripping members can be prevented from occurring.

What I claim is:

1. An electro-hydraulic servo mechanism comprising:

a hydraulic actuator formed with a pair of hydraulic chambers and having an output member which is displaced by a differential pressure between said hydraulic chambers, the output member being connected with an object to be controlled;

an electro-hydraulic conversion means for controlling an introduction of fluid to and a distance of fluid from said hydraulic chambers in response to an electric signal so that displacement of said output members can be controlled;

a first differential transformer for outputting a first induced electromotive force proportional to the displacement of said output member;

a control circuit for generating said electric signal in response to the output of said first differential transformer and to an external command signal and for outputting said electric signal to said electro-hydraulic conversion means;

a pressure receiving member that is displaced in response to said differential pressure between said hydraulic chambers; and a second differential transformer for outputting a second induced electromotive force proportional to the displacement of said pressure receiving member and for biasing the output of said second differential transformer to the output of said first differential transformer;

said first differential transformer comprising a first core member connected to said output member of said hydraulic actuator, a first coil, and second and third coils for generating said first induced electromotive force;

said second differential transformer comprising a second core member coupled to said pressure receiving member, a fourth coil connected in series with said first coil of said first differential transformer, and fifth and sixth coils for generating said second induced electromotive force.

2. An electro-hydraulic servo mechanism as set forth in claim 1, wherein said electro-hydraulic conversion means comprises an electromagnetic servo valve of the proportional control type.

3. An electro-hydraulic servo mechanism comprising:

a hydraulic actuator formed with a pair of hydraulic chambers and having an output member which is displaced by a differential pressure between said hydraulic chambers, the output member being connected with an object to be controlled;

an electro-hydraulic conversion means for controlling an introduction of fluid to and a discharge of fluid from said pair of hydraulic chambers in response to an electric signal so that displacement of said output member can be controlled;

a first differential transformer for outputting a first induced electromotive force proportional to the displacement of said output member;

a control circuit for generating said electric signal in response to the output of said first differential transformer and to an external command signal and for outputting said electric signal to said electro-hydraulic conversion means;

a pressure receiving member that is displaced in response to said differential pressure between said hydraulic chambers; and a second differential transformer for outputting a second induced electromotive force proportional to the displacement of said pressure receiving member and for biasing the output of said second differential transformer to the output of said first differential transformer;

said first differential transformer comprising a first core member connected to said output member, a primary first coil, and secondary second and third coils for generating said first induced electromotive force, said second and third coils being connected so that they become reversed polarities;

said second differential transformer comprising as second core member coupled to said pressure receiving member, a primary fourth coil connected in series with said primary first coil of said first differential transformer, and secondary fifth and sixth coils for generating said second induced electromotive force, said fifth coil of said second differential transformer being connected in series with said second coil of said first differential transformer, and said sixth coil of said second differential transformer being connected in series with said third coil of said first differential transformer.

4. An electro-hydraulic servo mechanism as set forth in claim 3, wherein said control circuit comprises a rectification circuit connected to said second differential transformer, an operational amplifier connected to said rectification circuit, a smoothing filter connected to said operational amplifier, a summing amplifier to which the output of said operation amplifier and said external command signal are inputted, and a current amplifier.

5. An electro-hydraulic servo mechanism as set forth in claim 1, wherein said object to be controlled is a control surface such as the rudder, elevator, ailerons flaps of an aircraft.

6. An electro-hydraulic servo mechanism as set forth in claim 3, wherein said object to be controlled is a control surface such as the rudder, elevator, ailerons, flaps of an aircraft.

* * * * *